United States Patent
Nishikawa et al.

(10) Patent No.: US 6,225,424 B1
(45) Date of Patent: May 1, 2001

(54) POLYETHYLENE RESIN AS A MATERIAL OF A CONTAINER FOR A HIGH PURITY CHEMICAL, AND A CONTAINER FOR A HIGH PURITY CHEMICAL MADE THEREOF

(75) Inventors: Hiroaki Nishikawa; Tatsuhiko Ogusu, both of Mie (JP)

(73) Assignee: Tosoh Corporation, Shinnanyo (JP)

( * ) Notice: Subject to any disclaimer, the term of this patent is extended or adjusted under 35 U.S.C. 154(b) by 0 days.

(21) Appl. No.: 09/145,612

(22) Filed: Sep. 2, 1998

(30) Foreign Application Priority Data

Sep. 3, 1997 (JP) .................................................. 9-238230

(51) Int. Cl.[7] .............................. C08F 4/626; C08F 4/64
(52) U.S. Cl. .......................... 526/90; 526/290; 526/348; 526/352; 428/35.7; 524/318; 524/394; 524/451
(58) Field of Search .......................... 428/35.7; 524/318, 524/394, 451; 526/90, 290, 348, 352

(56) References Cited

U.S. PATENT DOCUMENTS

| 4,395,359 | * | 7/1983 | Wagner et al. | 252/429 B |
| 4,988,783 | * | 1/1991 | Beran et al. | 526/129 |

OTHER PUBLICATIONS

Mitsubishi Kasei Corp, Derwent Abstract 1989–282988.*

* cited by examiner

*Primary Examiner*—Rena L. Dye
*Assistant Examiner*—Sow-Fun Hon
(74) *Attorney, Agent, or Firm*—Oblon, Spivak, McClelland, Maier & Neustadt, P.C.

(57) ABSTRACT

This invention aims at providing a polyethylene resin suitably used as a material of the container for a high purity chemical, which permits substantially no transference of fine particles and dissolution of metals into the chemical being minimized. This object is acheived by using a polyethylene resin having (1) to (5) properties described below as a material of the container for a high purity chemical:

(1) a density of 0.94–0.97 $g/cm^3$;
(2) a melt flow rate under a load of 21.6 Kg at 190° C. of 2–50 g/10 minutes;
(3) a ratio (Mw/Mn) of average molecular weight in weight (Mw) against average molecular weight in number (Mn) determined by gel permeation chromatography (GPC) of 8–15;
(4) an extractable matter by boiling normal hexane of 0.1 weight % or less; and
(5) a chlorine content of 15PPM or less with respect to the weight of polyethylene resin.

6 Claims, No Drawings

POLYETHYLENE RESIN AS A MATERIAL OF A CONTAINER FOR A HIGH PURITY CHEMICAL, AND A CONTAINER FOR A HIGH PURITY CHEMICAL MADE THEREOF

BACKGROUND OF THE INVENTION

1. Field of the Invention

This invention relates to a resin serving as a material of a polyethylene container which is suitably used in the industrial fields for the production of semiconductor units and fine machining parts, or in the production of high purity chemicals, and medical/pharmaceutical products which even when filled with a high purity chemical, permits substantially no transference of fine particles to the chemical or substantially no dissolution of metals into the chemical.

2. Description of the Related Art

Recently, with the remarkable technical progress in the field of electronic industry, the demand for high purity chemicals becomes acute. Such high purity chemicals are essential for the fabrication of electronic circuits such as large-scale integrated circuits or LSI and others. More specifically, chemicals used for the processes such as cleaning/etching of wafers, wiring/etching of insulating films, cleaning of tools, and preparation of developing solutions, resist diluents, resist removing solutions and drying solutions include sulfuric acid, hydrochloric acid, nitric acid, hydrofluoric acid, ammonium fluoride, an aqueous solution of hydrogen peroxide, isopropyl alcohol, xylene, Tetramethylammonium hydoxide, methanol, acetic acid, phosphoric acid, aqueous solution of ammonia, Propylene glycol monomethyl-ether acetate, Dimethyl sulfaxide, N-methyl-2-pyrrolidone, ECA, ether lactate, etc. Conventionally, the substance used as a material of the container for those high purity chemicals include polyethylene resins because they are sufficiently resistive to chemicals and impact, and inexpensive. However, with conventional containers made of polyethylene resins, the resin may dissolve into the chemical within, or contaminants including deteriorated resin may pollute the content, which has posed a problem. Thus, the previous resins have a limitation as a material of the container for high purity chemicals. Indeed, with the further compaction of ultra-fine LSIs, the current demand for the tolerable limit of metal impurities falls to 0.1 PPB or less, even though the same was 1 PPB previously. Sterner requests for high quality become manifest in other aspects: although previously contamination by fine particles with a diameter of 0.5 µm or less was rejected, currently contamination by particles with a diameter of 0.2 µm or less, and at a density of 100 particles/ml was rejected. This tendency requiring sterner standards for high quality is further emphasized nowadays: contamination by fine particles with a diameter of 0.1 µm is regarded as problematic, and the tolerable limit is set at 100 particles with a diameter of 0.1 µm or more for a unit space of 1 ml. In compliance with such stern requirement, has been eagerly wanted the advent of a polyethylene resin suitably used for the container for high purity chemicals, which is sufficiently clean to satisfy the current high standards regarding the contamination resulting from metal impurities and fine particles.

As a response to meet such expectation, Japanese Examined Patent Publication No. 5-41502 proposes a method whereby a high density polyethylene (HDPE) with a melt index of 0.1–8 g/10 minutes and density of 0.94 g/cm$^3$ or more is employed for the manufacture of a container of hydrofluoric acid, but it does not give any description regarding the possibility of contamination by additives which have been added to the resin. Similarly, Japanese Examined Patent Publication No. 6-51399 discloses a container with a laminated structure suitable for the storage of sulfuric acid or the like whose outer layer is made of polyethylene containing a light shielding agent, and the innermost layer is made of a mixture of a metal salt of fatty acid and a hindered phenol anti-oxidant blended at a specified ratio to give a density of 0.958 g/cm$^3$ or more, number average molecular weight of 5,000–12,000 and Mw/Mn of 15 or more. But the size of fine particles measured is 0.5 µm or more, which means low level. Further, Japanese Unexamined Patent Publication Nos. 7-62161 and 7-257540 propose a method for the manufacture of a polyethylene container wherein the extraction amount of resin via a hydrocarbon solvent and the content of low molecular weight components are suppressed, and the addition of an anti-oxidant, neutralizing agent and light-fast agent is limited. The container, however, has a number of defects open for improvement: ash from a catalyst remaining in the polyethylene resin may give adverse effects; appropriate measures may be required for the prevention of metal impurities from dissolving into a chemical stored within; and the allowable level regarding the size of fine particles is set at 0.2 µm or more, or a rather slack standard.

In addition to above, because it is often cumbersome to put a high purity chemical into small containers one after another, a demand is acute for the development of a method by which is obtained a polyethylene resin resistive to impact and suitable for the manufacture of big containers, because such a material would enable a great reduction in transportation cost.

Japanese Examined Patent Publication No. 4-20773 proposes a big container suitable for the storage of high purity chemicals which consists of an outer cylindrical portion made of FRP or the like and serving as a support, and an inner cylindrical portion fitting to the interior of the former and made of polyethylene. The polyethylene resin has a melt index of 0.01–0.04 g/10 minutes, and a density of 0.953–0.957 g/cm$^3$, and does not substantially contain any additive possessed of a metal component. But, it discharges fine particles with a diameter of 0.5 µm or more at a density of 10–20/ml. True, this container does not substantially contain any additive possessed of a metal component, and only includes an anti-oxidant consisting of a hindered phenol compound, but this alone would not be enough to suppress the number of fine particles with a diameter of 0.2 µm or less down to 100/ml or less. Furthermore, the proposal by Japanese Examined Patent Publication No. 4-20773 requires the addition of an outer cylindrical portion for the mechanical support, which will complicate the involved production processes. Thus, it is necessary to develop a method by which a big container suitable for the storage of high purity chemicals is obtained without resorting to any mechanical support.

SUMMARY OF THE INVENTION

This invention aims at providing a polyethylene resin serving as a material of the container for high purity chemicals, and a container for high purity chemicals made thereof wherein the dissolution of resin into a chemical within, and contamination by deteriorated substances from the resin is minimized, and discoloration of the resin is inhibited, and thus a long term use thereof is possible. In another aspect, this invention aims at providing a polyethylene resin which, when used as a material of a large container with a capacity of 50l or more, minimizes the dissolution of contaminants, is excellent in resistance to impact, and ensures a repeated use over a long period, and a large container for high purity chemicals made thereof.

To attain above object, the present inventors had studied hard, and found that the use of a polyethylene resin having specific properties would solve above problems, and thus achieved this invention.

To put it concretely, this invention relates to a polyethylene resin serving as a material of the container for high purity chemicals and having the properties as cited in the following paragraphs (1) to (5).

(1) The density (JIS K6760-1981) lies between 0.94–0.97 g/cm$^3$.
(2) The melt flow rate under a load of 21.6 kg at 190° C. (JIS K7210-1976, Condition 7) is 2–50 g/10 minutes.
(3) The ratio (Mw/Mn) of average molecular weight in weight (Mw) against average molecular weight in number (Mn) determined by gel permeation chromatography (GPC) is 8–15.
(4) The extractable matter by boiling normal hexane is 0.1 weight % or less.
(5) The chlorine content is 15 PPM or less with respect to the weight of polyethylene resin.

Further, the content of ash of polyethylene resin is preferably 50 PPM or less with respect to the weight of polyethylene resin. Furthermore, for the polyethylene resin of this invention the identity of additives and their added amounts are preferably specified. To put it more specifically, as a neutralizing agent (A), a metal salt of fatty acid is preferably added at a concentration of 150 PPM or less with respect to the weight of resin, and/or, as an antioxidant (B), a phenol anti-oxidant is preferably added at a concentration of 800 PPM or less. Still further, the melt tension (MT) of polyethylene resin of this invention at 190° C. preferably has a following relation with respect to the melt flow rate (to be abbreviated as HLMFR)(determined according to JIS K7210-1978, Condition 7 and expressed in g/10 minutes).

Log $MT \geq -0.455 \times$ Log $HLMFR + 1.64$

Still further, the melt tension (MT) at 190° C. is preferably 15 g or more.

DESCRIPTION OF THE PREFERRED EMBODIMENTS

The polyethylene resin of this invention serving as a material of the container for high purity chemicals will be described in detail below.

The polyethylene resin used in this invention as a material of the container for high purity chemicals can be obtained through the intervention of a highly active catalyst such as a Ziegler catalyst or a metallocene catalyst. For example, a preferable manufacture of the resin of this invention can be achieved by introducing a highly active Ziegler catalyst comprising a compound of a transition metal like titanium or zirconium, a compound of magnesium (the last-mentioned two are termed as a solid catalytic component mainly composed of Al, Ti, Mg and Cl), and an organic compound of aluminum (B) for promoting polymerization, and by mixing it with ethylene or ethylene and α-olefin with a carbon number of 3–20 to allow the latter to copolymerize to give a polymer having a desired density and by polymerization.

The α-olefin with 3–20 carbon atoms includes propylene, 1-butene, 4-methyl-1-pentene, 3-methyl-1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-hepatadecene, 1-octadecene, 1-nonadecene, 1-eicosene, etc.

Polymerization required for the production of the polyethylene resin can be achieved, for example, by slurry polymerization, gas phase polymerization or solution polymerization. What is the better of them is slurry polymerization wherein a polymerization medium having not less than six but not more than ten carbon atoms such as normal hexane or normal heptane is employed in order to inhibit the entry of low molecular weight polymers into the resin (otherwise the entry of such low molecular weight polymers will cause an increased formation of metal impurities into a chemical or formation of fine particles which also act as a contaminant), and the medium is incorporated into a multiple step polymerization. The multiple step polymerization, for example, may be a two-step polymerization which depends on the use of a low molecular weight component having a density of 0.94–0.98 g/cm$^3$ and a high molecular weight component having a density of 0.89–0.95 g/cm$^3$ at a weight ratio of 20:80– 80:20 (weight of low molecular weight component against the weight of high molecular weight component). Alternatively, polymerization may proceed using following compounds:

(I) 35–60 weight % of a low molecular weight component of a homopolymer resulting from ethylen polymerization or a copolymer resulting from the copolymerization of ethylene and α-olefin with 3–20 carbons, which satisfies the following conditions (a) and (b), that is,
(a) the limiting viscosity number (η1) at O-Dichlorobenzene 140° C. is 0.6–1.5 dl/g, and
(b) the density (JIS K6760-1981) is 0.95–0.98 g/cm$^3$, or 35–60 weight % of homopolymer resulting from the polymerization of ethylene and α-olefin with 3–20 carbon atoms; and
65–40 weight % of high molecular weight component of a copolymer resulting from the copolymerization of ethylene and α-olefin with 3–20 carbons, which satisfies the following conditions (c) and (d), that is,
(c) the limiting viscosity number (η2) at ODCB 140° C. is 2.5–15 dl/g, and
(d) the density (JIS K6760-1981) is 0.89–0.95 g/cm$^3$, and of α-olefin with 3–20 carbon atoms. Any kinds of above compounds can be used, regardless of the methods by which they have been obtained, and any kinds of components (I) and (II) can be used regardless of the order in which they have been polymerized.

For the polyethylene resin to be suitable for the present purpose, the appropriate density, melt flow rate, molecular weight distribution (Mw/Mn), extract amount via boiling normal hexane, and chlorine content are determined as follows.

Namely, the density (JIS K6760-1981) should be in the range of 0.94–0.97 g/cm$^3$: if it were below 0.94 g/cm$^3$ the amount of polymer dissolving into a high purity chemical stored in the container would increase so much as to cause the development of fine particles there, while if it were over 0.97 g/cm$^3$, it would make the container less resistive to chemicals and thus the mechanical strength of the container would decrease.

The melt flow rate (JIS K7210-1975, Condition 7, HLMFR) of the polyethylene resin in question pressed by a load of 21.6 kg at 190° C. should be in the range of 2–50 g/10 minutes: if it were below 2 g/10 minutes, the flow properties would be insufficient, while if it were over 50 g/10 minutes, the melt tension would become so low that the blow molding of the resin would become difficult.

When it is desired to obtain a container having a capacity of 50l or more through blow molding, the polyethylene resin preferably has an HLMFR of 15 g/10 minutes or less, because, when it has an HLMFR of 15 g/10 minutes or less, the container made therefrom will have a sufficient resistance to fall.

The ratio (Mw/Mn) of average molecular weight in weight (Mw) against average molecular weight in number (Mn) of the polyethylene resin determined by gel permeation chromatography (GPC) should be in the range of 8–15: if it were below 8, the molecular weight distribution would become so narrow in range that the flow properties would be impaired, which would accelerate the deterioration of the resin, become impaired, while if it were over 15, the molecular weight distribution would become so wide in range that the fraction of low molecular weight components would increase so much as to cause the increment of fine particle number. Further, if Mw/Mn exceeded 15, the pinch-off section of the parison joint would have an inadequate shape, and the container made from the resin would have an insufficient resistance to fall.

The extractable matter of polyethylene resin extracted by boiling normal hexane should be in the range of 0.1 weight % or less: if it were over 0.1 weight %, the dissolution of polymer components into a chemical would increase, which might cause the increment of fine particles.

The chlorine content of polyethylene resin determined with a fluorescent X-ray device should be 15 PPM or less with respect to the total weight of resin: if it were over 15 PPM, chlorine would corrode the molding machine, or the metals of mold, and thus require the addition of a neutralizing agent because chlorine will also cause discolorization of the molded article, and the existence of such neutralizing agent might cause the pollution of metal impurities.

Further, the content of ash in polyethylene resin should be 50 PPM or less with respect to the weight of resin: if it were over 50 PPM, ash would dissolve into a chemical, to accelerate the accumulation of metal impurities therefrom. The ash content of a given resin represents the content of residues through perfect combustion to ash and expressed in terms of weight PPM with respect to the total weight of resin. Determination of the ash content of a given resin comprises the steps of putting the resin in an electric furnace, and roasting it to metal oxides, and the ash mainly consists from the metal such as (Al, Mg, Ti). The ashes are contributed by the residues from polymerization catalyst/cocatalyst, metal containing additives such as a neutralization agent, and impurities/contaminants in the production of polyethylene.

Furthermore, for manufacture of the polyethylene container for a high purity chemical of this invention, preferably no additives such as an anti-oxidant, light-fast stabilizer, and neutralizer or any other additives may be used. The neutralizing agent refers here to metal salts of fatty acid represented by calcium stearate and zinc stearate, and hydrotalcites. Because both of them readily dissolve into a chemical to cause the development of metal impurities, preferably they should not be added to the resin material. Principally, it is preferred not to add any additives, but in cases where addition of additives can not be avoided because of the properties of involved materials, a due care should be paid to followings: (A) addition of a metal salt of fatty acid to serve as a neutralizing agent should be 150 PPM or less, and/or, (B) addition of a phenol anti-oxidant to serve as an anti-oxidant should be 800 PPM or less. Observation of such precaution will enable the prevention of deterioration of resin which otherwise would result from oxidation exerted by a chemical within, and further the inhibition of formation of fine particles and discoloration of the container. It is preferable from above to add (A) a metal salt of fatty acid at 150 PPM or less as a neutralizing agent, and/or, (B) a phenol anti-oxidant at 800 PPM or less as an anti-oxidant, to the polyethylene resin of this invention. As a neutralizing agent, metal salts of fatty acid are more preferred than hydrotalcites, because they contain less metal constituents. If a metal salt of fatty acid were added at a concentration higher than 150 PPM with respect to the weight of resin, metal constituents would readily dissolve into a chemical, causing the development of metal impurities. If a phenol anti-oxidant were added at a concentration higher than 800 PPM with respect to the weight of resin, it would readily dissolve into a chemical, causing the formation of fine particles. As the preferable phenol antioxidant, can be mentioned monophenol antioxidants such as 2,6-di-t-butyl-p-cresol, butylated hydroxyanisol, 2,6-di-t-butyl-4-ethylphenol, stearyl-β-(3,5-di-t-butyl-4-hydroxyphenyl) propionate, etc., and bis-phenol anti-oxidants such as 2,2'-methylenebis(4-methyl-6-t-butylphenol) and 2,2'-methylenebis(4-ethyl-6-t-butylphenol).

To give a melt extensibility which, during blow molding, faithfully adapts to the interior of mold when blown out, such that the resulting mold article has a uniform thickness in its walls, and to have a sufficient resistance to fall, the melt tension (MT, to be expressed in g) of the resin at 190° C. preferably meets the following inequality with respect to the melt flow rate (JIS K7210 -1976, Condition 7, HLMFR) :under a load of 21.61 g at 190° C.

$$\text{Log } MT \geq -0.455 \times \text{Log } HLMFR + 1.64$$

Further, for the resin to be used for big blow molding of a large container having a capacity of 50l or more, it must have a sufficient melt tension to sustain its own weight, even when being reduced to a melt parison, and thus the melt tension (MT in g) of the resin at 190° C. is preferably 15 g or more. More preferably it is not less than 15 g and not more than 65 g. If MT is short of above range, the walls of container would become irregular in thickness, which would lower the resistance of container to fall, and thus MT is preferably chosen to be 15 g or more.

To obtain a polyethylene resin suitable for the manufacture of large containers based on big blow molding, it is preferable to subject the mixture of the above two components polymers to a cross-linking treatment. The appropriate cross-linking treatment, for example, includes a number of methods: one is to melt and knead the mixture in the presence of oxygen, a second is to add an organic peroxide to the mixture and to heat the resulting mass at a temperature higher than the disintegration point of that organic compound, or to melt and knead the mass, and a third is to expose the mixture to radiation of electromagnetic waves. Of them, the first method wherein the mixture is melted/kneaded in the presence of oxygen, or the second method wherein an organic peroxide is added to the mixture and the resulting mass melted/kneaded at a temperature higher than the disintegration point of the organic peroxide are more preferred, because of their economy and easiness for handling. Further, when an organic peroxide is added, a cross-linking aid may also be added in addition to the organic peroxide.

The organic peroxide may include, for example, dialkylperoxides such as di-t-butylperoxide, dicumylperoxide, t-butylcumylperoxide, 2,5-dimethyl-2,5-bis(t-butylperoxy) hexane, 2,5-dimethyl-2,5-bis(t-butylperoxy)hexyne -3,α,α'-bis(t-butylperoxy)diisopropylbenzene, etc., peroxyesters such as 2,5-dimethyl-2,5-bis(benzoylperoxy)hexane, t-hexylperoxybenzoate, t-butylperoxy-m-tolylbenzoate, t-butylperoxybenzoate, bis(t-butylperoxy)isophthalate, etc., and peroxyketals such as 1,1-bis (t-butylperoxy) 3,3,5-trimethylcyclohexane, 1,1-bis(t-hexylperoxy)cyclohexane, 1,1-bis(t-hexylperoxy) 3,3,5-trimethylcyclohexane, 1,1-bis (t-butylperoxy)cyclohexane, 1,1-bis(t-butylperoxy) cyclododecane, n-butyl 4,4-bis(t-butylperoxy)valerate, etc. Of them, the use of 2,5-dimethyl-2,5-bis(t-butylperoxy) hexyne-3,α,α'-bis(t-butylperoxy)diisopropylbenzene is preferred.

The concentration of oxygen or an organic peroxide required for the cross-linking treatment is not confined to any specific limits as long as HLMFR and melt tension of ethylene polymer after the cross-linking treatment are kept within the specific ranges. When oxygen gas is used, the concentration of oxygen in the gas atmosphere within the extruder is preferably kept in the range of 100 ppm to 10%, or more preferably 0.1 to 5% depending on the speed of extrusion and the supply speed of oxygen containing gas to the extruder. When an organic compound is used, it is preferably added at 1 to 1000 PPM, or more preferably 5 to 200 PPM with respect to the weight of resin. If the organic compound were added at a concentration higher than the above range, cross-linking would proceed too much and thus the resulting polyethylene melt would not sufficiently extend during blowing by air, the molded article would not give a good mold surface, or gel would readily develop as a result of the growth of local cross-links. In extreme cases, polyethylene might degrade by oxidation. If the organic compound were added at a concentration lower than the above range, the elasticity of melt would lower which might cause the wall thickness of the molded article to be irregular depending on the blow conditions.

The polyethylene resin of this invention serving as a material of the container or bottle for high purity chemicals may be molded by a known molding method such as blow molding, injection molding, rotational molding or extrusion molding whereby the resin has been initially molded into a container-like premold, and then into a container for high purity chemicals. Alternatively, the resin may be processed by a known processing method such as injection molding, film or sheet extrusion, and compression molding into a plate, cylinder or polygon, the openings thereof are then covered with another, and the seam is hermetically sealed by heating, so that a finished container is obtained. As a third alternative, the resin may be molded by a known molding method such as blow molding, film or sheet extrusion, rotational molding or extrusion molding into a film, sheet or cylinder, which is then applied to the interior of a structure shaped like a container as its lining or interior container.

Particularly, the blowing molding which consists of placing a blow molding machine in a clean room, and introducing into it air removed of particles having the size of 0.01 μm or more by filtration for blowing is suitable for the production of clean containers of this invention. No special limitations are imposed regarding the shape and capacity of the container. But, to improve the insulation of content against the formation from the container and the mechanical strength of container, the polyethylene resin of this invention for the container of high purity chemicals may be used as a material of the inner layer, with an ethylene-vinyl alcohol copolymer, polyvinyl alcohol resin or polyamide resin, etc as a material of the intermediate layer. Or, to reinforce the mechanical strength of container, FRP or a metal may be used as a material of the outer layer, or made into the outer cylinder with the resin of this invention being used as a material of the inner layer, or made into the inner cylinder. As a third alternative, the polyethylene resin of this invention serving as a material of the container for high purity chemicals may be used as the inner layer or the lining of a plastic drum or chemical drum, or of a large cargo container such as an intermediate bulk container, which comes into direct contact with the content.

The container may have a light shielding property according to the nature of a chemical stored within, and, to assume such light shielding property, the container may have its inner layer made of the polyethylene resin of this invention and its outer wall may have a laminar structure including at least one layer composed of a light shielding material such as an organic or inorganic pigment. Alternatively, an organic or inorganic pigment may be added to the polyethylene resin of this invention as long as the cleanliness of the container is kept within the specified range.

No special limitations are imposed regarding the shape of the large container, but preferably the container has a capacity of 50 l or more, more preferably 100 l or more. Particularly, if the container has a capacity of 200~220 l, it will serve as a substitute for an oil drum having a capacity of 200~220 l. Alternatively, it is possible to use the resin of this invention as a material of the lining of a container having a capacity of 50 l up to the volume the same with that of 4 t container whose outer wall is made of FRP or a metal.

This invention will be described below with reference to examples, but this invention must not be limited to those examples.

Testing was performed as follows.

(1) The density was determined according to JIS K6760-1981: the test piece was immersed in hot water maintained at 100° C. for one hour, left at room temperature to be gradually cooled, and put into a density gradient tube kept at 23° C.

(2) Mw/Mn. The test sample was applied to a 150C ALC/GPC provided by Waters Co. (column, GMHHR-H(S) provided by Tosoh Corp., and solvent, 1,2,4-trichlorobenzene), and thus Mw and Mw/Mn were determined by GPC. The column elution volume was calibrated by the universal calibration method where a standard polyethylene by Tosoh Corp. is used.

(3) The extractable matter by boiling normal hexane (n-C6): extraction of 2 g of resin via a solvent comprising normal hexane was performed for two hours using a Soxhlet extractor. The extractable matter was expressed as the weight percent of extract with respect to the total weight of resin.

(4) Chlorine content. About 10 g of polyethylene resin was compressed by a heating press into a test piece, and its chlorine content was qualitatively determined with a fluorescent X-ray device and expressed as a weight PPM with respect to the total weight of resin.

(5) Ash content was determined according to JIS K2272-1985: 25 g of polyethylene resin was placed on a platinum evaporating dish(conical) which had been weighed, a glass cover was placed on the top of the dish for closure, the content was heated with a burner to be gradually combusted to ash, then it was transferred to an electric furnace where it was completely roasted to ash at 775±25° C., and the ash was weighed. The ash content was expressed as the weight PPM of the fraction of ash through perfect combustion with respect to the total weight of resin.

(6) Test on the resistance to chemicals. The polyethylene resin was molded by blow molding into a container having a capacity of 500 ml; the container was filled with special reagent class sulfuric acid (98%, Wako Pure Chemicals); the container was left: at 50° C. for a specified period (three, four or five weeks); and the discoloration (turning yellowish or blackish) of the container was visually inspected, and scored according to a four stage scale.

Discoloration was scored according to a scale: 1, no discoloration present; 2, slight discoloration present; 3, moderate discoloration present; and 4, remarkable discoloration present.

(7) Number of fine particles. The polyethylene resin was molded by blow molding into a container having a capacity of 500 ml, which was used for this test. In a clean room, 250 ml of ultra-pure water was poured into the container; five washings each consisting of shaking for 15 seconds were repeated; and another 250 ml of ultra-pure water was poured into the container which was left for 30 minutes. Particles whose diameter was 0.1 $\mu$m or more were counted with a particle-in-liquid counter (KL-25, LYON Co.). In another run, a same container was washed five times with ultra-pure water in the same manner as above; 250 ml of ultra-pure water was poured into the container which was then kept at 50° C. for one month; and particles whose diameter was 0.1 $\mu$m or more were counted with the particle-in-liquid counter. The number of particles in water was expressed as particles/ml.

The test was also performed on large containers having a capacity of 100 L the production of which consisted of molding the resin by big blow molding. The test proceeded as follows. In a clean room, 50 L of ultra--pure water was poured into the container; five washings each consisting of shaking for 15 seconds were repeated; the container was filled with 100 L of ultra-pure water and left for 30 minutes; and particles whose diameter was 0.2 $\mu$m or more were counted with the particle-in-liquid counter (KL-22, LYON Co.). In another run, a same container was washed five times with ultra-pure water in the same manner as above; 100 L of ultra-pure water was poured into the container which was then kept at 50° C. for one month; and particles whose diameter was 0.2 $\mu$m or more were counted with the particle-in-liquid counter. The number of particles in water was expressed as particles/ml.

(8) Concentration of metal impurities. The polyethylene resin was molded by blow molding into a container having a capacity of 500 ml; the container was washed five times with ultra-pure water; the container was filled with ultra-pure water and kept at 50° C. for one month; and the spectral activity was determined with an ICP-MS meter or a frameless atomic light absorption photometer (detection limit being 0.01 PPB). Twelve metals including Al, Ca, Cr, Mg, Ti, Zr, Na, K, Fe, Mn, Zn and Ni were examined.

The test was also performed on large containers having a capacity of 100 L production of which consisted of molding the resin by big blow molding; the container was washed five times with 50 L of ultra-pure water; the container was filled with 100 L of ultra-pure water and kept at 50° C. for one month; and the same assay as above was performed.

(9) Melt tension (MT). The resin was kept at 190° C. and its MT was determined with a melt tension tester (Toyo Fine Engineering Co.).

(10) Fall test at low temperatures. [Adjustment of background condition] A 100 L of 50% aqueous solution of ethylene glycol was poured into a container having a capacity of 100 L, which was then kept in a room maintained at −18° C. for 24 hours or more. [Actual fall test] When it was found that the content assumed a temperature of −18° C., the container was allowed to fall from a height of 1 m in such a way as to hit its trunk flatly against a concrete floor; and the damage was visually checked. When no damage was apparent, the height was raised at intervals of 20 cm until 3.2 m at maximum was reached. The height (m), from which a given container was allowed to fall to receive the first sign of damage, was taken as a measure representative of the resistance to fall of that container.

EXAMPLE 1

(1) Preparation of Solid Catalyst Component (A)

According to the description of Japanese Unexamined Patent Publication No. 60-262802, a Ziegler catalyst (solid catalyst component (A)) mainly composed of Al, Ti, Mg and Cl was prepared. To put it more concretely, 40 g (1.65 mol) of magnesium powder and 224 g (0.66 mol) of titanium tetrabuthoxide were put into a 31 glass flask from whose internal cavity air had been completely replaced with nitrogen. A mixture comprising 108 g (1.8 mol) of i-propanol and 135 g (1.8 mol) of n-buthanol and dissolving 2.0 g of iodine was poured into a dropping funnel. The mixture was allowed to fall dropwise into the 31 flask at a temperature from 80 to 95° C. over two hours. The reaction mixture was heated further to 120° C. and stirred for one hour, to complete the reaction. Then, 2.11 of hexane was added to give a uniform solution. Next, this uniform solution was put into a stainless autoclave having a capacity of 101 and containing a stirrer; the interior of autoclave was kept at 45° C.; 1.32 g (3.3 mol) of 30% hexene solution of diethylaluminumchloride was slowly added thereto over one hour; and the mixture- was stirred at 60° C. for another one hour. Next, 197 g (3.3 gatom of silicon) of methylhydropolysiloxane (the viscosity at 25° C. was about 30 centimeter stokes) was added, and the mixture was stirred at 68–70° C. for one hour. The mixture was cooled to 45° C., and then 2.8 kg (9.1 mol) of 50% hexane solution of i-butylaluminumdichloride was added over two hours. On completion of the addition, the mixture was stirred at 70° C. for on hour to give a solid catalyst component(A). The resulting solid catalyst component (A) was removed of residual unreacted components and reaction by-products through decantation after addition of hexane. And, the solid catalyst component after washing was used as a hexane slurry for the production of a polyethylen resin.

(2) Production of a Polyethylene Resin

Into a continuous reactor having a capacity of 370 l were poured dehydrated and purified hexane at a rate of 110 l /hour, triisobutylaluminum as an organic aluminum compound (B) at a rate of 120 mmol/hour, the solid catalyst component (A) at a rate of 0.5 g/hour, ethylene at a rate of 25.4 kg/hour, and hydrogen at such a rate as to render the concentration of hydrogen to be 0.35 mol/mol of ethylene so that the first stage polymerization proceeds continuously under a condition where temperature and overall pressure were maintained at 85° C. and 30 kg/cm$^2$ respectively, and the mixture was allowed to polymerize in the reactor for 3.4 hours of average residence time. The first stage ethylene homopolymer (low molecular weight component) gave the following results: the melt flow rate (JIS K7210-1976, Condition 4) was 16 g/10 minutes when pressed by a load of 2.16 Kg at 190° C., and the density was 0.974 g/cm$^3$.

The hexane slurry containing the first stage polymer was deprived of unreacted hydrogen and ethylene in a flush tank, and then introduced into another continuous reactor having a capacity of 545 l. While hexane was being further poured into this reactor at a rate of 45 l/hour, ethylene was added al a rate of 17.7 kg/hour, 1-butene at a rate of 0.8 kg/hour and hydrogen at a molar ratio of 0.14 mol/mol of ethylene, to allow the second stage polymerization to proceed at an overall pressure of 20 kg/cm$^2$ and at 80° C. for 3.3 hours of average residence time. The compounds resulting from the second stage polymerization were Transferred to the flush tank where unreacted hydrogen, ethylene and 1-butene residues were removed. The reaction product was washed with hexane flowing at a rate of 50/hour, and submitted to a drying process to produce an ethylene copolymer (powdery mixture comprising the low molecular weight component and a high molecular weight component). The ratio of low molecular weight component in the polymer was 45 weight %, while the same of high molecular weight component was 55 weight %.

The powder obtained by the two step polymerization as described above was converted with a 50 mmϕ extruder into pellets, without receiving any neutralizing agent or anti-oxidant, to produce a polyethylene resin. The polyethylene resin had a density of 0.956 g/cm$^3$; its melt flow rate was 28 g/10 minutes when measured under a load of 21.6 Kg at 190° C.; its Mw/Mn determined by GPC was 9.2; extractable matter by boiling normal hexane amounted to 0.08 wt %; the chlorine content was 10 PPM; and the ash content was 35 PPM.

(3) Evaluation of Container

The aforementioned polyethylene resin was molded by blow molding into containers which were submitted to the tests whereby the resistance to chemicals, discharge of fine particles and concentration of metal impurities were determined.

As shown in Table 1, when the container was examined of the resistance to chemicals, it proved to be so resistive to chemicals that it remained free from any discoloration even when exposed to chemicals for three weeks. As regards the metal contamination, no metal contaminant giving a concentration of 0.01 PPB or more existed, and formation of fine particles during storage was also negligible.

EXAMPLE 2

Ethylene and butene-1 were allowed to copolymerize in hexane in the same manner as in Example 1 except that hydrogen necessary for the second stage polymerization was supplied to the reactor at a rate of 0.06 mol/mol of ethylene, and thereby the second step copolymerization was completed to produce a powdery polymerization compound. The powder alone was converted with a 50 mmϕ extruder into pellets, without receiving any neutralizing agent or anti-oxidant, to produce a polyethylene resin. The polyethylene resin had a density of 0.955 g/cm$^3$; its melt flow rate was 8.5 g/10 minutes when measured under a load of 21.6 Kg at 190° C.; its Mw/Mn determined by GPC was 13.5; extractable matter by boiling normal hexane amounted to 0.08 wt %; the chlorine content was 9 PPM; and the ash content was 20 PPM. The aforementioned polyethylene resin was molded by blow molding into containers which were submitted to the tests whereby the resistance to chemicals, discharge of fine particles and concentration of metal impurities were determined.

As shown in Table 1, when the container was examined of the resistance to chemicals, it proved to be so resistive to chemicals that it remained free from any discoloration even when exposed to chemicals for three weeks. As regards the metal contamination, no metal contaminant giving a concentration of 0.01 PPB or more existed, and formation of fine particles during storage was also negligible.

COMPARATIVE EXAMPLE 1

Copolymerization of ethylene and 1-hexene in hexane in the presence of a Phillips catalyst mainly composed of Cr and SiO$_2$ was performed to produce a powdery polymerization compound. The powdery polymer alone was converted with a 50 mmϕ extruder into pellets, without receiving any neutralizing agent or anti-oxidant, to produce a plyethylene resin. The polyethylene resin had a density of 0.954 g/cm$^3$; its melt flow rate was 25 g/10 minutes when measured under a load of 21.6 Kg at 190° C.; its Mw/Mn determined by GPC was 7.2; extractable matter by boiling normal hexane amounted to 0.11 wt %; the chlorine content was 3 PPM; and the ash content was 180 PPM. The aforementioned polyethylene resin was molded by blow molding into containers which were then submitted to the tests whereby the resistance to chemicals, discharge of fine particles and concentration of metal impurities were determined.

As shown in Table 1, when the container was examined of the resistance to chemicals, it was found that it gave a sign of discoloration when exposed to chemicals for four weeks. As regards the metal contamination, chromium (Cr) contamination increased to 0.04 PPB, and the increase in the number of particles was considerable

COMPARATIVE EXAMPLE 2

Ethylene and butene-1 were allowed to copolymerize in hexane in the same manner as in Example 1 except that the average residence time in the first reactor was 1.2 hours for the first stage polymerization; the same was made 1.1 hours for the second stage polymerization; and the reaction product discharged from the second stage reactor was not washed with hexane. Through this polymerization reaction, a powdery polymerization compound was obtained. The powder alone was converted with a 50 mmϕ extruder into pellets, without receiving any neutralizing agent or anti-oxidant, to produce an ethylene resin. The polyethylene resin had a density of 0.956 g/cm$^3$; its melt flow rate was 28 g/10 minutes when measured under a load of 21.6 Kg at 190° C.; its Mw/Mn determined by GPC was 10.3; extractable matter by boiling normal hexane amounted to 0.08 wt %; the chlorine content was 20 PPM; and the ash content was 60 PPM. The aforementioned polyethylene resin was molded by blow molding into containers which were then submitted to the tests whereby the resistance to chemicals, discharge of fine particles and concentration of metal impurities were determined.

As shown in Table 1, as regards the metal contamination, aluminum (Al) contamination became 0.2 PPB, a value above 0.1 PPB.

COMPARATIVE EXAMPLE 3

Ethylene and butene-1 were allowed to copolymerize in hexane in the same manner as in Example 1 except that the ethylene homopolymer (low molecular weight component) used for the first stage polymerization had a melt flow rate of 100 g/10 minutes under a load of 2.16 Kg at 190° C. and a density of 0.979 g/cm$^3$; and hydrogen necessary for the first stage polymerization was supplied at a rate of 0.12 mol/mol of ethylene. Through this polymerization reaction, a powdery polymerization compound was obtained. The powder alone was converted with a 50 mmϕ extruder into pellets, without receiving any neutralizing agent or anti-oxidant, to produce an ethylene resin. The polyethylene resin had a density of 0.964 g/cm$^3$; its melt flow rate was 41 g/10 minutes when measured under a load of 21.6 Kg at 190° C.; its Mw/Mn determined by GPC was 16.0; extractable matter by boiling normal hexane amounted to 0.09 wt %; the chlorine content was 12 PPM; and the ash content was 20 PPM. The aforementioned polyethylene resin was molded by blow molding into containers which were then submitted to the tests whereby the resistance to chemicals, discharge of fine particles and concentration of metal impurities were determined.

As shown in Table 1, the container scarcely suffered discoloration, and no metal contaminant giving a concentration of 0.01 PPB or more existed. But, the increase in number of fine particles during storage was considerable.

0.35 mol/mol of ethylene so that the first stage polymerization proceeds continuously under a condition where temperature and overall pressure were maintained at 85° C. and 30 kg/cm² respectively, and the mixture was allowed to polymerize in the reactor for 1.8 hours of average residence time. The first stage ethylene homopolymer (low molecular weight component) gave the following results: the melt flow

TABLE 1

| | Resistance to chemicals | | | Concentration of metal impurities (PPB) | Number of particles (particles/ml) ≧0.1 μm | |
|---|---|---|---|---|---|---|
| | Exposure to chemicals, 3 weeks | Exposure to chemicals, 4 weeks | Exposure to chemicals, 5 weeks | Storage of 1 month | Five washings | Storage of 1 month |
| Example 1 | 1 | 2 | 3 | 0.01 or less | 20 | 45 |
| Example 2 | 1 | 2 | 3 | 0.01 or less | 25 | 50 |
| Comparative example 1 | 3 | 4 | 4 | Cr 0.04 | 35 | 120 |
| Comparative example 2 | 3 | 4 | 4 | Al 0.20 | 25 | 70 |
| Comparative example 3 | 1 | 2 | 3 | 0.01 or less | 30 | 110 |

EXAMPLE 3

(1) Preparation of Solid Catalyst Component (A)

According to the description of Japanese Unexamined Patent Publication No. 7-41513, a Ziegler catalyst (solid catalyst component (A)) mainly composed of Al, Ti, Mg and Cl was prepared. To put it more concretely, 40 g (1.65 mol) of metal magnesium powder and 225 g (0.66 mol) of titanium tetrabuthoxide were put into a 3l glass flask from whose internal cavity air had been completely replaced with nitrogen. To it was added 256 g (3.5 mol) of n-butanol previously supplemented with 2.0 g of iodine at 90° C. over two hours; and the reaction mixture, evolving hydrogen gas being removed in the mean time, was stirred at 140° C. for two hours being protected by a nitrogen seal. The reaction mixture was allowed to cool to 110° C., which was followed by the addition of 37 g (0.18 mol) of tetraethoxysilane and 25 g (0.17 mol) of tetramethoxysilane, and the resulting mass was stirred at 140° C. for two hours. Then, 2.1l of hexane was added thereto to produce a uniform solution. Next, this uniform solution was put into a stainless autoclave having a capacity of 10l and containing a stirrer; the interior of autoclave was kept at 45° C.; and 0.74 kg of hexane solution containing 1.4 mol of diethylaluminum chloride and 0.56 mol of i-butylaluminum dichloride were slowly added over one hour, and stirred for another one hour at 60° C. Next, 3.2 kg of hexane solution containing 10.4 mol of i-butylaluminum dichloride was added; and the mixture was stirred at 60° C. for one hour, to produce a solid catalyst component. The resulting solid catalyst component (A) was removed of residual unreacted components and reaction by-products through decantation after addition of hexane. And, the solid catalyst component after washing was used as a hexane slurry.

(2) Production of a Polyethylene Resin

Into a continuous reactor having a capacity of 370 l were poured dehydrated and purified hexane (water content is below 2 PPM) at a rate of 110 l/hour, triisobutylaluminum EMS an organic aluminum compound (B) at a rate of 164 mmol/hour, the solid catalyst component (A) at a rate of 0.95 g/hour, ethylene at a rate of 20.0 kg/hour, and hydrogen at such a rate as to render the concentration of hydrogen to be rate (JIS K7210-1976, Condition 4, to be abbreviated as MFR) was 18 g/10 minutes under a load of 2.16 Kg at 190° C., and the density was 0.974 g/cm³.

The hexane slurry containing the first stage polymer was deprived of unreacted hydrogen and ethylene in a flush tank, and then introduced into another continuous reactor having a capacity of 545 l. While hexane was being further poured into this reactor at a rate of 45 l/hour, ethylene was added at a rate of 20.0 kg/hour, 1-butene at a rate of 0.7 kg/hour and hydrogen at a molar ratio of 0.03 mol/mol of ethylene, to allow the second stage polymerization (production of high molecular weight component) to proceed under an overall pressure of 20 kg/cm² and at 80° C. for 1.4 hours of average residence time. The reaction product discharged from the second stage reactor was transferred to the flush tank where unreacted hydrogen, ethylene and 1-butene residues were removed; hexane was further added at a rate of 50 l/hour; and the reaction product was submitted to a drying process to produce a powdery ethylene copolymer. The ratio of low molecular weight component in the polymer was 50 weight %, while the corresponding value for the high molecular weight component was 50 weight %. The powdery polymerization compound which had been obtained by continuous two-step polymerization incorporating the two components different in molecular weight was converted with a 50 mmϕ extruder into pellets, without resorting to any neutralizing agent or anti-oxidant, to produce a polyethylene resin. The polyethylene resin had a density of 0.954 g/cm³; its melt flow rate was 5.6 g/10 minutes when measured under a load of 21.6 Kg at 190° C.; its Mw/Mn determined by GPC was 10.3; the melt tension at 190° C. was 22 g; the extractable matter by boiling normal hexane was 0.08 wt %; the ash content was 33 PPM; and the chlorine content was 8 PPM.

(2) Evaluation of Big Blow Molding and Molds Prepared Therethrough

Execution of a big blow molding depended on the use of a big blow molding machine (MB80/P115, Japan Steel Works, Ltd.), and was performed at 210° C., to produce a large container. The container, being cylindrical, had a diameter of 440 mmϕ, height of 800 mm, average wall thickness of 4 mm, capacity of 100 L and weight of 7.0 Kg.

The container was submitted to the tests whereby the resistance to fall at a low temperature, concentration of metal impurities and discharge of fine particles were determined.

As shown in Table 2, the resistance to fall was kept at a height of 3.2 m or more; no metal contaminant giving a concentration of 0.01 PPB or more existed; and formation of fine particles during storage was also negligible.

EXAMPLE 4

To the powdery polymerization compound obtained in Example 3 was added 500PPM of tetrakis-[methylene-3-(3', 5'-di-i-butyl-4'-hydroxyphenyl)propionate]methane as an antioxidant; and the resulting mass was converted with a 50 mmφ extruder into pellets, to produce a polyethylene resin. The resin was molded by big blow molding into large containers in the same manner as in Example 1 which were submitted to the tests whereby resistance to fall at a low temperature, concentration of metal impurities and discharge of fine particles were determined.

As shown in Table 2, the resistance to fall was kept at a height of 3.2 m or more; no metal contaminant giving a concentration of 0.01 PPB or more existed; and formation of fine particles during storage was also negligible.

COMPARATIVE EXAMPLE 4

To the powdery polymerization compound based on the use of a Phillips catalyst mainly composed of Cr and SiO2 was added 500 PPM of tetrakis-[methylene-3-(3',5'-di-i-butyl-4'-hydroxyphenyl)propionate]methane as an antioxidant, and the resulting mixture was converted with a 50 mmφ extruder into pellets, to produce a polyethylene resin. The polyethylene resin had a density of 0.946 g/cm$^3$; its melt flow rate was 5.2 g/10 minutes when measured under a load of 21.6 Kg at 190° C.; its Mw/Mn determined by GPC was 9.2; the melt tension at 190° C. was 33 g; extractable matter by boiling normal hexane amounted to 0.11 wt %; the ash consent was 170 PPM; and the chlorine content was less than 1 PPM. The resin was molded by big blow molding into large containers in the same manner as in Example 3, which were then submitted to the tests whereby resistance to fall at a low temperature, concentration of metal impurities, and discharge of fine particles were determined.

As shown in Table 2, the resistance to fall was kept at a height of 3.2 m or more. As regards the metal contamination, chromium (Cr) contamination increased to 0.03 PPB. Formation of particles having a diameter of 0.2 μm or more exceeded the tolerable limit or 100/ ml or less.

COMPARATIVE REFERENCE 1

The continuous two step polymerization comprising the use of ethylene and butene-1 in hexane was performed in the same manner as in Example 3 except that hydrogen was introduced into the second reactor at a molecular ratio of 0.05 mol/mol of ethylene, to produce a powdery polymerization compound. The powdery polymerization compound was converted with a 50 mmφ extruder into pellets, without resorting to any anti-oxidants, neutralizing agents, and UV ray absorbers nor any other additives, to produce a polyethylene resin. The polyethylene resin had a density of 0.955 g/cm$^3$; its melt flow rate was 8.5 g/10 minutes when measured under a load of 21.6 Kg at 190° C.; its Mw/Mn determined by GPC was 13.5; the melt tension at 190° C. was 14 g; extractable matter by boiling normal hexane amounted to 0.08 wt %; the ash content was 20 PPM; and the chlorine content was 9 PPM. The aforementioned polyethylene resin was molded by big blow molding into large containers which were then submitted to the tests whereby resistance to fall, concentration of metal impurities, and discharge of fine particles were determined.

As shown in Table 2, the resistance to fall was obliterated at a height of as low as 2.0 m or more; no metal contaminant giving a concentration of 0.01 PPB or more existed; and formation of fine particles during storage was also negligible.

COMPARATIVE EXAMPLE 5

The continuous two step polymerization comprising the use of ethylene and butene-1 in hexane was performed in the same manner as in Example 1 except that of Example 3 the water content in hexane medium was adjusted to 15 PPM, to produce a polyethylene resin. The polyethylene resin had a density of 0.955 g/cm$^3$; its melt flow rate was 4.6 g/10 minutes when measured under a load of 21.6 Kg at 190° C.; its Mw/Mn determined by GPC was 12.7; the melt tension at 190° C. was 26 g; extractable matter by boiling normal hexane amounted to 00.9 wt %; the ash content was 68 PPM; and the chlorine content was 19 PPM. The polyethylene resin was molded by big blow molding, without resorting to any neutralizing agents and anti-oxidants, into large containers which were then submitted to the tests whereby resistance to fall at a low temperature, concentration of metal impurities, and discharge of fine particles were determined.

As shown in Table 2, the resistance to fall was kept at a height of 3.2 m or more. As regards the metal contamination, however, aluminum (Al) contamination increased to 0.25 PPB. Formation of particles during storage was negligible.

TABLE 2

| | Resistance to fall at low temperatures | Concentration of metal impurities (PPB) | Number of particles (particles/ml) ≥ 0.2 μm | |
| --- | --- | --- | --- | --- |
| | −18° C., Flat fall | Storage of 1 month | Five washings | Storage of 1 month |
| Example 3 | 3.2 m or more | 0.01 or less | 10 | 12 |
| Example 4 | 3.2 m or more | 0.01 or less | 18 | 22 |
| Comparative example 4 | 3.2 m or more | Cr 0.03 | 100 | 120 |
| Comparative reference 1 | 2.0 m | 0.01 or less | 12 | 14 |
| Comparative example 5 | 3.2 m or more | Al 0.25 | 25 | 40 |

When the polyethylene resin of this invention is used as a material of the container for high purity chemicals, formation of contaminants from the resin occurring as solutes, or derived from deteriorated substances or metal impurities is minimized. Thus, this invention can provide a clean container compatible with the fabrication of ultra-fine LSI boards. In addition, the resin is so resistive to discoloration that the product made therefrom can be used over a considerable long time.

In another application, when the polyethylene resin of this invention is used as a material for a large container of high purity chemical, formation of contaminants from the resin occurring as solutes, or derived from deteriorated substances or metal impurities is minimized. Thus, this invention can provide a clean container suitably used for the fabrication of ultra-fine LSI boards. In addition, the resin is so resistive to fall that it can withstand repeated uses.

What is claimed is:

1. A polyethylene resin for a container for containing a high purity chemical which has the following (1) to (5) properties:

(1) a density (method JIS K6760-1981): 0.94–0.97 g/cm$^3$;

(2) a melt flow rate under a load of 21.65 Kg at 190° C. (method JIS K7210-1976, Condition 7): of 2–50 g/10 minutes;

(3) a ratio (Mw/Mn) of weight average molecular weight (Mw) to number average molecular weight (Mn) determined by gel permeation chromatography (GPC): of 8–15;

(4) an extractable matter by boiling normal hexane: of 0.1 weight % or less;

(5) a chlorine content: of 15 PPM or less with respect to the weight of the polyethylene resin; and wherein the polyethylene resin has an ash content of 50 PPM or less with respect to the weight of the polyethylene resin.

2. The polyethylene resin according to claim 1 wherein (A) a metal salt of fatty acid is added at 150 PPM or less as a neutralizing agent, and/or, (B) a phenol anti-oxidant is added at 800 PPM or less as an anti-oxidant, with respect to the weight of polyethylene resin.

3. The polyethylene resin according to claim 1 wherein the melt flow rate (JIS K7210-1976, Condition 7)(to be abbreviated as HLMFR and expressed in g/10 minutes) under a load of 21.6 Kg at 190° C., and the melt tension (MT and expressed in g) at 190° C. satisfy the following relation:

$$\text{Log } MT \geq -0.455 \times \text{Log } HLMFR + 1.64.$$

4. The polyethylene resin according to claim 1 wherein the melt tension (MT) at 190° C. is 15 g or more.

5. A container for a high purity chemical made of the polyethylene resin according to claim 1.

6. A large container for a high purity chemical having an internal volume of 50 l or more made of the polyethylene resin according to claim 3.

* * * * *